United States Patent [19]

Fries et al.

[11] Patent Number: 4,627,876
[45] Date of Patent: Dec. 9, 1986

[54] PRINTING INK

[75] Inventors: Werner Fries, Weil der Stadt; Karl-Wilhelm Klemm, Stuttgart, both of Fed. Rep. of Germany

[73] Assignee: BASF Farben & Fasern AG, Hamburg, Fed. Rep. of Germany

[21] Appl. No.: 731,765

[22] Filed: May 8, 1985

Related U.S. Application Data

[63] Continuation of Ser. No. 554,625, Nov. 23, 1983, abandoned.

[30] Foreign Application Priority Data

Nov. 25, 1982 [DE] Fed. Rep. of Germany ....... 3243532

[51] Int. Cl.$^4$ ............................................. C09D 11/06
[52] U.S. Cl. ...................................... 106/27; 523/400
[58] Field of Search .................... 106/20, 27; 523/400; 528/111.5, 295.5

[56] References Cited

U.S. PATENT DOCUMENTS

| | | | |
|---|---|---|---|
| 3,043,788 | 7/1962 | Bressler et al. | 528/111.5 |
| 3,247,136 | 4/1966 | Wynstra et al. | 528/111.5 |
| 3,427,266 | 2/1969 | Phillips et al. | 528/111.5 |
| 4,383,860 | 5/1983 | Uhlemayr | 106/27 |
| 4,390,688 | 6/1983 | Walz et al. | 523/400 |

*Primary Examiner*—Amelia B. Yarbrough
*Attorney, Agent, or Firm*—Wells & Wells

[57] ABSTRACT

The invention relates to a printing ink which is to be used for printing paper and which consists of pigment, an alkyd resin binder which has been modified with fatty acids having an iodine number below 20, and, if desired, further binder and further customary constituents, such as lubricants, solvents, thickeners and thixotropic agents. The alkyd resin is an epoxy alkyd resin having an acid number below 11 and is present in the printing ink in an amount of at least 40% by weight, based on the total binder content. It has been prepared by reacting (a) a fatty acid of 6–20 carbon atoms or a mixture of such acids or triglycerides thereof,
(b) a polyol,
(c) an epoxy resin having a molecular weight of 380–2,900, an epoxide equivalent weight of 175 to 2,050 and an ester equivalent weight of 80 to 200 and
(d) a dicarboxylic acid, the proportion of the epoxy resin amounting to 1 to 40 mole %, based on the total amount of polyol and epoxy resin.

14 Claims, No Drawings

PRINTING INK

This application is a continuation of application Ser. No. 554,625, filed Nov. 23, 1983, now abandoned.

BACKGROUND OF THE INVENTION

The invention relates to a printing ink which is to be used for printing paper and which consists of pigment, an alkyd resin binder which has been modified with fatty acids having an iodine number below 20, and, if desired, further binder and further customary constituents, such as lubricants, solvents, thickeners and thixotropic agents.

One of the starting materials in the production of newsprint is decolored waste paper in the form of an aqueous press cake. Suitable waste paper are woodfree and halftone paper, in particular paper from books, for example telephone directories. The decoloring of printed waste paper is also referred to as deinking. The decolorability of printed paper has thus gained in importance, and the interest in printing inks which lead to decolorable or deinkable prints has consequently increased.

German Offenlegungsschrift No. 3,023,118, corresponding to U.S. Pat. No. 4,383,860, discloses a printing ink which contains, as a binder, an alkyd resin which has been modified with oils, fatty acids and/or fatty alcohols having an iodine number of less than about 95. This disclosed printing ink is said to have the advantage of being readily deinkable.

SUMMARY OF THE INVENTION

It has now been found that, contrary to what German Offenlegungsschrift No. 3,023,118 says, the printing ink cannot be completely removed by deinking under practical conditions. It is therefore the object of the present invention to specify a printing ink which has improved deinkability.

This object is achieved, surprisingly, when the alkyd resin which has been modified with fatty acids and which is present as an essential binder in the printing ink is an epoxy alkyd resin.

The invention therefore provides a printing ink which is of the type mentioned in the introduction and which contains, as the alkyd resin, at least 40% by weight, based on total binder content, of an epoxy alkyd resin which has an acid number below 11 and which has been prepared by reacting
(a) a fatty acid of 6–20 carbon atoms or a mixture of such acids or triglycerides thereof,
(b) a polyol,
(c) an epoxy resin having a molecular weight of 380–2,900, an epoxide equivalent weight of 175 to 2,050 and an ester equivalent weight of 80 to 200 and
(d) a dicarboxylic acid, the proportion of the epoxy resin amounting to 1 to 40 mole %, based on the total amount of polyol and epoxy resin.

DESCRIPTION OF THE PREFERRED EMBODIMENTS

The molecular weight specified here and below is the number average molecular weight.

Component (a) is advantageously coconut oil and/or palmkernel oil or the fatty acids obtained therefrom.

The polyol used is advantageously trimethylolpropane, glycerol and/or pentaerythritol.

Preferred dicarboxylic acids are phthalic acid, isophthalic acid, adipic acid, saturated dimeric fatty acids or tetrahydrophthalic acid. The epoxy alkyd resin advantageously has an OH number of 50 to 150.

The printing ink advantageously contains, as further binder, hydrocarbon resin in a proportion of up to 60% by weight, based on the total binder content. This improves the abrasion resistance of freshly prepared prints without significantly impairing deinkability. It is an additional benefit that the degree of fogging and emulsifying of the printing ink in the printing machine is reduced.

The invention also relates to a process for preparing a printing ink by dispersing, by means of a dispersing device, pigment, an alkyd resin binder which has been modified with fatty acids having an iodine number below 20, and, if desired, further binder and further customary constituents, such as lubricants, solvents, thickeners and thixotropic agents, which comprises preparing the alkyd resin binder by reacting with one another
(a) a fatty acid of 6–20 carbon atoms or a mixture of such acids or triglycerides thereof,
(b) a polyol,
(c) an epoxy resin having a molecular weight of 380–2,900, an epoxide equivalent weight of 175 to 2,050 and an ester equivalent weight of 80 to 200 and
(d) a dicarboxylic acid, the proportion of the epoxy resin amounting to 1 to 40 mole %, based on the total amount of polyol and epoxy resin.

Component (a) in the process according to the invention advantageously is coconut oil and/or palmkernel oil or the fatty acids obtained therefrom.

The preferred polyol is trimethylolpropane, glycerol and/or pentaerythritol, and the dicarboxylic acid used is advantageously phthalic acid, isophthalic acid, adipic acid, saturated dimeric fatty acids or tetrahydrophthalic acid.

The further binder used in preparing the printing ink is advantageously a hydrocarbon resin in a proportion of up to 60% by weight, based on the total binder content.

The invention further relates to the use of the printing ink in planographic, relief and gravure printing, in particular the use of a printing ink which consists of pigment, an epoxy alkyd resin binder which has been obtained by reacting a fatty acid of 6–20 carbon atoms and an iodine number below 20 or a mixture of such acids or triglycerides thereof, a polyol, an epoxy resin having a molecular weight of 380–2,900, an epoxide equivalent weight of 175 to 2,050 and an ester equivalent weight of 80 to 200 and a dicarboxylic acid, the proportion of the epoxy resin amounting to 1 to 40 mole %, based on the total amount of polyol and epoxy resin, and, if desired, further binder and further customary constituents, such as lubricants, solvents, thickeners and thixotropic agents, for preparing deinkable prints on paper.

SPECIFIC EXAMPLES

The invention will now be explained in more detail by reference to illustrative examples.

EXAMPLE 1

Preparation of a printing ink I 1,100 parts by weight of coconut acid are heated under a slow stream of protective gas to 130° C. in a reactor. 400 parts by weight of trimethylolpropane, 510 parts by weight of a commercially available epoxy resin having a molecular weight of 1,400, an epoxide equivalent weight of 870 to 1,025 and an ester equivalent weight of 175, and 490 parts by weight of phthalic anhydride and then added, together with 160 parts by weight of xylene as an entrainer. The temperature is raised further until the entrainer distils over at a fast rate. At this temperature the esterification reaction is continued until an acid number below 11 has been reached. Thereafter the xylene is distilled off in vacuo.

The resin obtained is dissolved in a mineral oil with a boiling range from 230° to 260° C. in such a way that an 80% strength solution is formed. This solution is incorporated by means of a three-roll mill in a printing ink of the following composition:

| | |
|---|---|
| Carbon black | 16 parts by weight |
| Polyethylene wax | 1 part by weight |
| Coconut fat | 6 parts by weight |
| Epoxy resin (80% strength in mineral oil) | 66 parts by weight |
| Mineral oil (boiling range 230–260° C.) | 11 parts by weight |

EXAMPLE 2

Preparation of printing ink II

The epoxy alkyd resin described in Example 1 is incorporated by means of a three-roll mill in a printing ink of the following composition:

| | |
|---|---|
| Carbon black | 16 parts by weight |
| Polyethylene wax | 1 part by weight |
| Coconut fat | 6 parts by weight |
| Epoxy resin (80% strength in mineral oil) | 30 parts by weight |
| Aromatic hydrocarbon resin (60% strength in mineral oil) | 36 parts by weight |
| Mineral oil | 11 parts by weight |

The aromatic hydrocarbon resin used has a softening point of 117° to 123° C. and a bromine number of 15 to 30. The mineral oil used has a boiling range from 230° to 260° C.

EXAMPLE 3

Preparation of printing ink III 1,150 parts by weight of coconut fat under a stream of nitrogen are heated to 100° C. in a reactor, 350 parts by weight of trimethylolpropane and 1 part by weight of lithium stearate are added at this temperature. The mixture is heated to 250° C., and the transesterification reaction is carried out at this temperature. When the mixture has cooled down to 150° C., 509 parts by weight of an epoxy resin having a molecular weight of 1,400, an epoxide equivalent weight of 870–1,025 and an ester equivalent weight of 175, 490 parts by weight of phthalic anhydride and, as an entrainer, 160 parts by weight of xylene are added. The entrainer distilling off at a lively rate, the esterification reaction is continued until an acid number below 11 has been reached. Thereupon the xylene is distilled off in vacuo, and an 80% strength solution of the resin in mineral oil is prepared.

This epoxy alkyd resin is incorporated by means of a three-roll mill in a printing ink of the following composition:

| | |
|---|---|
| Carbon black | 16 parts by weight |
| Polyethylene wax | 1 part by weight |
| Coconut fat | 6 parts by weight |
| Epoxy alkyd resin (80% strength in mineral oil) | 30 parts by weight |
| Hydrocarbon resin as described in Example 2 (60% strength in mineral oil) | 36 parts by weight |
| Mineral oil | 11 parts by weight |

Performance of printing trials and deinking of the printed products

Prints are offset-printed using printing inks I, II and III. The motif printed is a page of a telephone directory, and it is printed on both sides of telephone directory paper.

The resulting prints are aged at 60° C. for 144 hours. The samples are then conditioned under standard atmospheric conditions of 23° C./50% relative humidity. The samples are comminuted and are then subjected to a flotation deinking process. In this process, the paper is disintegrated in two stages and treated with an aqueous solution of sodium hydroxide, waterglass, oleic acid and hydrogen peroxide. The rising printing ink foam is separated off in a flotation cell. The suspension left behind is used to prepare, by means of a suction filter, sample sheets which are then dried. The degree of printing ink removal is determined by measuring the whiteness of these sample sheets, which is done by measuring the reflectance for a key wavelength of 457 nm. The numerical measure of printing ink removal (DEM) is given by the average whiteness values (WG) of the sample sheets of printed stock (BS) which has been subjected to disintegration in the absence of chemicals, of unprinted stock (US) which has been obtained by treated unprinted parts, for example border strips, and deinked stock (DS) according to the following formula:

$$DEM\ (\%) = \frac{WG_{DS} - WG_{BS} \cdot 100}{WG_{US} - WG_{BS}}$$

The prints prepared with printing inks I, II and III give the following numerical measures of printing ink removal:

| | |
|---|---|
| Printing ink I | DEM = 80–84% |
| Printing ink II | DEM = 79–83% |
| Printing ink III | DEM = 79–83%. |
| Comparative example: | |

An alkyd resin binder is prepared in a manner equivalent to that of Example 1 a of German Offenlegungsschrift No. 3,023,118 from 1,418 parts by weight of coconut oil, 0.1 part by weight of yellow lead oxide, 448 parts by weight of trimethylolpropane, 628 parts by weight of isophthalic acid and 5.9 parts by weight of p-toluene-sulfonic acid, using xylene as an entrainer. This alkyd resin binder is processed into a printing ink in a manner equivalent to that of Example 2b of German Offenlegungsschrift No. 3,023,118 by using polyethylene wax, phenol-modified mineral oil, soluble colophony resin, gilsonite asphalt and mineral oil.

Sample prints are prepared under the same conditions as in the examples described above and are deinked. The resulting numerical measure of printing ink removal is 71 to 72.

What we claim is:

1. In a printing ink which is deinkable from printed paper and which consists of pigment, an alkyd resin binder which has been modified with fatty acids having an iodine number below 20, the improvement comprising said alkyd resin, at least 40% by weight, based on total binder content, comprising an epoxy alkyd resin which has an acid number below 11 and which has been prepared by reacting (a) a compound selected from the group consisting of fatty acids having 6-20 carbon atoms, triglycerides of said fatty acids, or a mixture of said acids;

(b) a polyol;

(c) an epoxy resin having a molecular weight of 380-2,900, an epoxide equivalent weight of 175 to 2,050 and an ester equivalent weight of 80 to 200; and (d) a dicarboxylic acid, the proportion of said epoxy resin amounting to 1 to 40 mole percent, based on the total amount of said polyol and said epoxy resin.

2. The printing ink of claim 1, wherein component (a) is selected from the group consisting of coconut oil, palmkernel oil, the fatty acids obtained therefrom, or mixtures thereof.

3. The printing ink of claim 1, wherein said polyol is selected from the group consisting of trimethylolpropane, glycerol, pentaerythritol, or a mixture thereof.

4. The printing ink of claim 1, wherein said dicarboxylic acid is selected from the group consisting of phthalic acid, isophthalic acid, adipic acid, saturated dimeric fatty acids or tetrahydrophthalic acid.

5. The printing ink of claim 1, wherein said epoxy alkyd resin has an OH number of 50 to 150.

6. The printing ink of claim 1, which contains, as further binder, up to 60% by weight, based on the total binder content, of hydrocarbon resin.

7. In a process for preparing a printing ink deinkable from printed paper by dispersing, by means of a dispersing device, pigment, an alkyd resin binder which has been modified with fatty acids having an iodine number below 20, the improvement comprising preparing said alkyd resin binder by reacting with one another:

(a) a compound selected from the group consisting of fatty acids having 6-20 carbon atoms, or a mixture of said acids, or triglycerides of said fatty acids;

(b) polyol;

(c) an epoxy resin having a molecular weight of 380-2,900, an epoxide equivalent weight of 175 to 2,050, and an ester equivalent weight of 80 to 200; and (d) a dicarboxylic acid, the proportion of the epoxy resin amounting to 1 to 40 mole percent, based on the total amount of said polyol and said epoxy resin.

8. The process of claim 7, wherein component (a) is selected from the group consisting of coconut oil, palmkernal oil, fatty acids obtained therefrom, or a mixture thereof.

9. The process of claim 7, wherein said polyol is selected from the group consisting of trimethylolpropane, glycerol, pentaerythritol, or a mixture thereof.

10. The process of claim 7, wherein said dicarboxylic acids are selected from the group consisting of phthalic acid, isophthalic acid, adipic acid, saturated dimeric fatty acids, or tetrahydrophthalic acid.

11. The process of claim 7, wherein said epoxy alkyd resin has an OH number of 50 to 150.

12. The process of claim 7, which contains a further binder comprising a hydrocarbon resin in an amount of up to 60% by weight, based on the total binder content.

13. A paper substrate having print thereon from the printing ink of claim 1, from planographic, relief or gravure printing.

14. In a printing ink composition which is deinkable from printed paper comprising pigment, an epoxy alkyd resin binder, the improvement comprising said binder obtained by reacting fatty acids having 6-20 carbon atoms and having an iodine number below 20, a mixture of said fatty acids, or triglycerides thereof, a polyol, an epoxy resin having a molecular weight of 380-2,900, an epoxide equivalent weight of 175 to 2,050 and an ester equivalent weight of 80 to 200, and a dicarboxylic acid, the proportion of said epoxy resin amounting to 1 to 40 mole percent, based on the total amount of said polyol and said epoxy resin, and further binder and further constituents including lubricants, solvents, thickeners, and thixotropic agents.

* * * * *